United States Patent

[11] 3,633,113

[72] Inventors Stanley J. Grubel;
John F. Merrill, both of Wappingers Falls, N.Y.

[21] Appl. No. 887,257
[22] Filed Dec. 22, 1969
[45] Patented Jan. 4, 1972
[73] Assignee International Business Machines Corporation
Armonk, N.Y.

[54] TIMED PULSE TRAIN GENERATING SYSTEM
4 Claims, 2 Drawing Figs.

[52] U.S. Cl. .......... 328/29, 307/261, 307/269, 307/293, 328/62, 328/63, 328/105, 328/180
[51] Int. Cl. .......... H03k 5/08, H03k 1/00, H03k 3/04
[50] Field of Search .......... 307/260, 261, 265, 269, 293; 328/29, 30, 62, 63, 72, 74, 105, 153, 179, 180

[56] References Cited

UNITED STATES PATENTS

| | | | |
|---|---|---|---|
| 3,037,568 | 6/1962 | Hannum | 328/29 X |
| 3,327,225 | 6/1967 | Schell | 307/269 X |
| 3,356,934 | 12/1967 | Halfhill et al. | 328/63 |
| 3,378,692 | 4/1968 | Lenz | 328/62 X |

*Primary Examiner*—Stanley D. Miller, Jr.
*Attorney*—Sughrue, Rothwell, Mion, Zinn & Macpeak

ABSTRACT: A system for generating a pulse train whose constituent pulses occur synchronously with a reference transition of a high-frequency oscillator, which may be easily extended to a system for generating a plurality of such pulse trains, and includes a frequency divider circuit for generating pulses whose frequency is a percentage of the frequency of the oscillator, a delay circuit for delaying the pulse output of the frequency divider circuit, and a gated pulse generator for generating the constituent pulses of the pulse train whenever enabled by the output from the delay circuit and triggered by the reference transition. The timing of the constituent pulses may be further controlled by a second delay circuit at the output of the pulse-generating gate.

INVENTORS
STANLEY J. GRUBEL
JOHN F. MERRILL

BY Sughrue, Rothwell, Mion, Zinn & Macpeak
ATTORNEYS

TIMED PULSE TRAIN GENERATING SYSTEM

BACKGROUND OF THE INVENTION

1. Field of the Invention

This invention relates to a system for generating timed pulse trains, that is, pulse trains in which the initiation time of each constituent pulse is accurately controlled, and more particularly to such a system which is capable of generating a plurality of timed pulse trains.

2. Description of the Prior Art

Often times it is necessary to generate a pulse train whose constituent pulses occur at a fixed and definite time, as in the clocking of data signals. Likewise, it is many times necessary to generate a plurality of such pulse trains whereby the pulses in each pulse train occur in a fixed time relationship with the pulses of the other pulse trains. One technique for generating a plurality of such pulse trains is disclosed in U.S. Pat. No. 3,383,525, entitled "Selectable Cycle Timer with Plural Outputs of Different Time Intervals and Automatic Reset." This technique employs a clock source which advances the count of a counter comprised of a series of multivibrators. The outputs of the multivibrators are connected to coincidence gates which generate the output pulses. As the counter is advanced, the coincidence gates are selectively satisfied to yield outputs at certain counts of the counter. Since the counter is driven by a clock source, the outputs are in a timed relationship with the oscillations of this clock source. However, because of the vagaries of the response times of the various multivibrators comprising the counter this timed relationship is not exact since the output pulses occur only after the counter has reacted. Therefore, this type method has proved unsuitable where the timed relationship of the pulses in the plurality of pulse trains must be very exact. A need for such exactness has arisen in the testing of very fast logic circuitry and it is the purpose of this invention to provide a system to achieve this timed relationship.

SUMMARY OF THE INVENTION

The invention is directed primarily to the provision of a system for generating a pulse train whose constituent pulses occur in a timed relationship with a sinusoidal oscillating source or a pulse source. Furthermore, the system is easily adaptable to providing a plurality of such pulse trains in which the constituent pulses occur in a timed relationship to those of the other pulse trains.

The exact timing relation is achieved by employing a sinusoidal oscillating source not only as a timing means but also as a triggering means for triggering the pulses in the pulse trains. This triggering effect is achieved by designating the zero level of either a positive or negative transition of the oscillating source as a reference transition and only generating a pulse upon the occurrence of this reference transition. Therefore, initiation of the pulses in the pulse trains is not dependent upon the response time of a counting circuit and the pulses, thus, occur in an exact timing relation with the oscillating source. The width of the generated pulses is controlled by a frequency divider circuit which generates pulses whose frequency is a percentage of the frequency of the oscillating source. These pulses are then delayed by a coarse programmable delay circuit to generate an enabling pulse to enable a pulse-generating gate; once enabled, a pulse-generating gate will generate a pulse at the next reference transition. The pulse generated will, of course, cease when the enabling pulse has ceased. In addition, a fine programmable delay with an analog control is provided after the pulse-generating gate which allows the timing of the pulse to be varied to increments smaller than the period of the oscillating source. By providing a plurality of coarse programmable delays and pulse-generating gates, a plurality of such pulse trains may be generated.

An object of the invention is, therefore, to provide a system for the generation of a pulse train whose pulses occur in a timed relationship with an oscillating source.

Another object of the invention is to provide a pulse-generating system whereby the pulses are triggered by a reference oscillation in the oscillating source and therefore not dependent upon response times of a counting circuit.

A further object of the invention is to provide a system for generating a plurality of pulse trains whose pulses occur in a timed relationship.

DESCRIPTION OF THE PREFERRED EMBODIMENT

Figure 1:
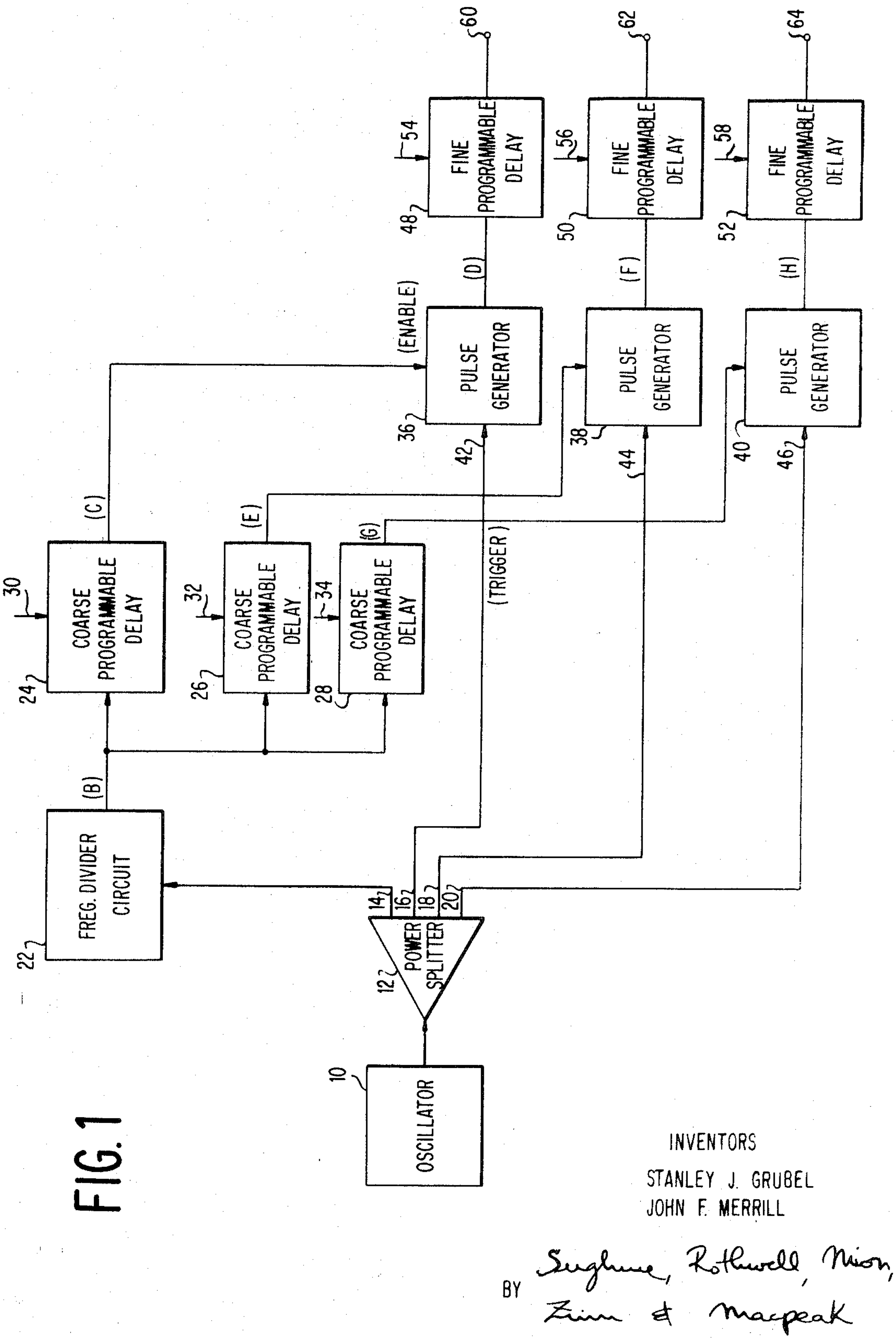
FIG. 1 is a block diagram of the preferred embodiment of the invention.

FIG. 1 illustrates a block diagram which implements the invention. It illustrates an embodiment with three channels, that is, it generates three output pulse trains; however, the invention may be employed for only one channel or many more than three. The oscillator 10 generates a sine wave which is used as a timing reference for synchronizing the pulses produced on all channels. The sine wave produced by the oscillator 10 is split by power splitter 12 so that it may appear on a plurality of conductors 14, 16, 18 and 20. The conductor 14 transmits the sinusoidal oscillations to a frequency divider circuit 22. The frequency divider circuit is merely a countdown circuit which provides a pulse output whose frequency is less than the oscillator's but whose output is synchronized with the oscillator. This pulse waveform is illustrated on line B of FIG. 2 and, as can be seen, the countdown is 10 since 10 oscillations of the oscillator as shown in line A occur for each period of the pulse output generated by the frequency divider circuit. In practice, this countdown would, of course, be far greater but it is reduced here for illustrative purposes.

Figure 2:
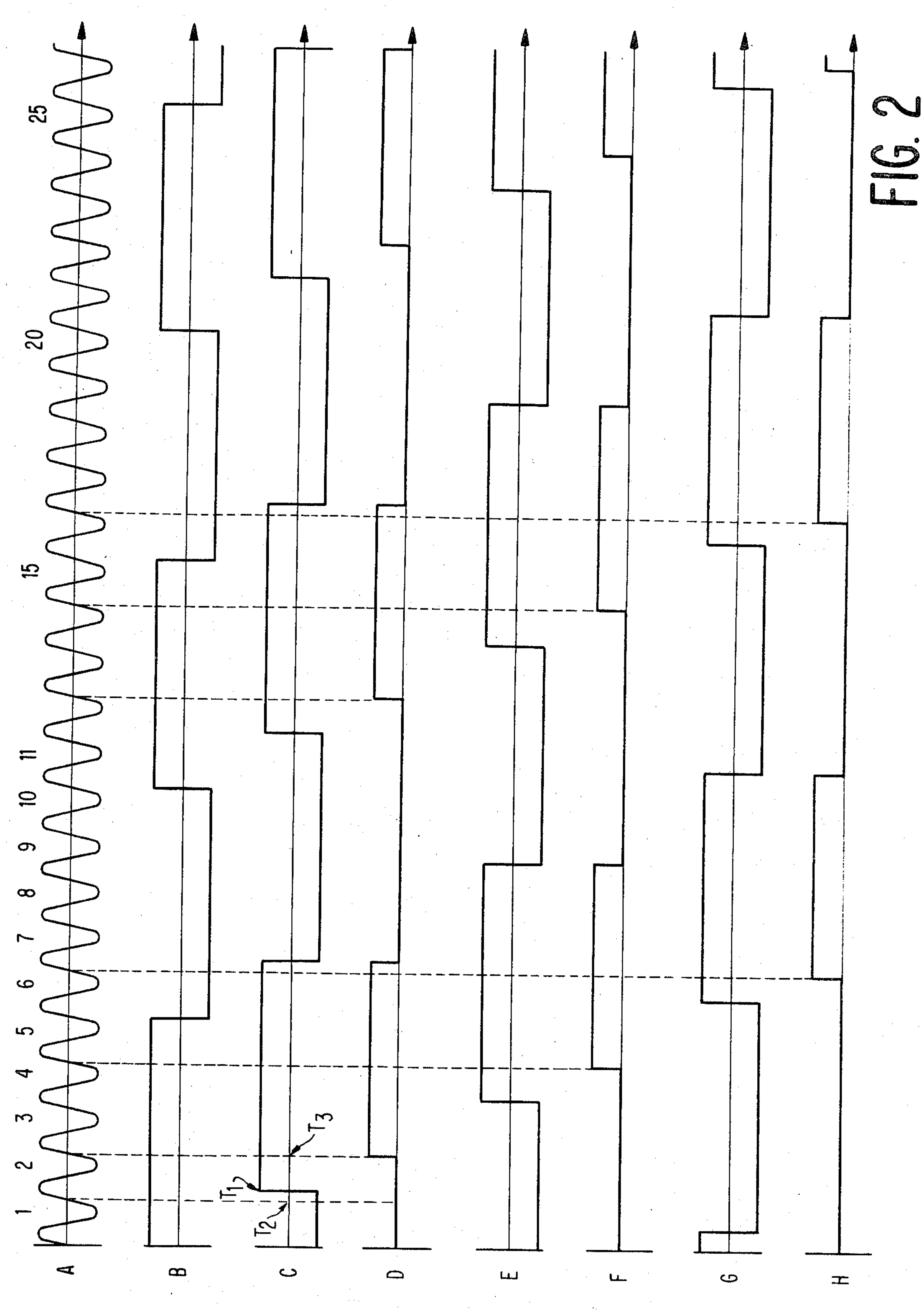
FIG. 2 are wave diagrams used in explanation of the invention.

The output from the frequency divider circuit is then delayed by coarse programmable delay circuits 24, 26 and 28 which are conventional in design. The amount of delay produced by these circuits is controlable by an input analog level as indicated by the terminals 30, 32 and 34. The purpose of the delay circuits 24, 26 and 28 is to control the time at which enable pulses occur by delaying the output of the frequency divider 22. Sample outputs from the delay circuits 24, 26 and 28 are illustrated in FIG. 2 by lines C, E and G, respectively. As can be seen, the waveform C has been delayed for a time period greater than one but less than two periods of the oscillator, waveform E has been delayed for a time period greater than three but less than four oscillator periods, and waveform G has been delayed for a time period greater than six but less than seven oscillator periods.

These delayed pulses constitute enabling signals to the pulse-generating gates 36, 38 and 40, that is, these pulses set these gates so that they may generate a pulse whenever the next trigger signal occurs at the trigger inputs 42, 44 and 46. The trigger input used is a reference transition of the oscillator 10 and, as hereinafter used, the zero level of a positive transition of the sinusoidal waveform is designated as a reference transition and is interpreted as a trigger signal by the inputs 42, 44 and 46.

Thus, the outputs of the pulse-generating gates 36, 38 and 40, as shown on lines D, F, and H in FIG. 2, are pulse trains which have been initiated by a reference transition of the oscillator 10 whenever the pulse-generating gates 36, 38 and 40 have been enabled by the outputs D, E and G of the delay circuits 24, 26 and 28. Therefore, it can be seen that the timed relationship between these pulses will be exact multiples of the period of the oscillator and not dependent upon the response times of the frequency divider circuit and the delay circuits. Thus, as long as an enabling pulse is produced by the delay circuits 24, 26 and 28 at some time during the desired period of the oscillator, the pulse outputs will occur in precise timed relationships. This is illustrated in FIG. 2 on line C. An enabling pulse may occur at any time T1 between times T2- and T3 so as to generate an output pulse D at time T3 since the output pulse will not be triggered by a reference transition of the oscillator until time T3.

The fine programmable delay circuits 48, 50 and 52 are provided to control the timing of the pulses within a period of the oscillator, that is, to times smaller than a period of the oscillator. As in the coarse delay circuits, these delays are controlled by an analog level at the terminals 54, 56 and 58.

While the invention has been particularly shown and described with reference to a preferred embodiment thereof, it will be understood by those skilled in the art that various changes in form and details may be made therein without departing from the spirit and scope of the invention.

What is claimed is:

1. A system for generating a pulse train whose constituent pulses occur synchronously with predetermined reference transitions of a reference source comprising:

a. timing means driven by said source for generating pulses whose periods equal a predetermined number of periods of said source;

b. pulse-generating means for generating said constituent pulses of said pulse train;

c. delay means connected to said timing means for delaying said pulses generated by said timing means;

d. first interconnection means coupled between said pulse-generating means and said delay means for enabling said pulse-generating means with said pulses generated by said timing means and delayed by delay means; and e. second interconnection means coupled between said pulse-generating means and said reference source for triggering said pulse-generating means with said reference transitions, whereby said constituent pulses are generated by said pulse-generating means whenever enabled by said delay means and triggered by said reference transitions.

2. The system of claim 1 wherein said source comprises a sinusoidal oscillator.

3. The system of claim 1 further comprising:

a. a plurality of said pulse-generating means;

b. a plurality of said delay means, whereby a plurality of said pulse trains may be generated.

4. The system of claim 3 further comprising second delay means connected to the output of said pulse-generating means, whereby the timing of said constituent pulses may be further controlled within time increments smaller than the period of said source.

* * * * *